C. & G. P. THARP.
Improvement in Harrows.
No. 121,021. Patented Nov. 14, 1871.
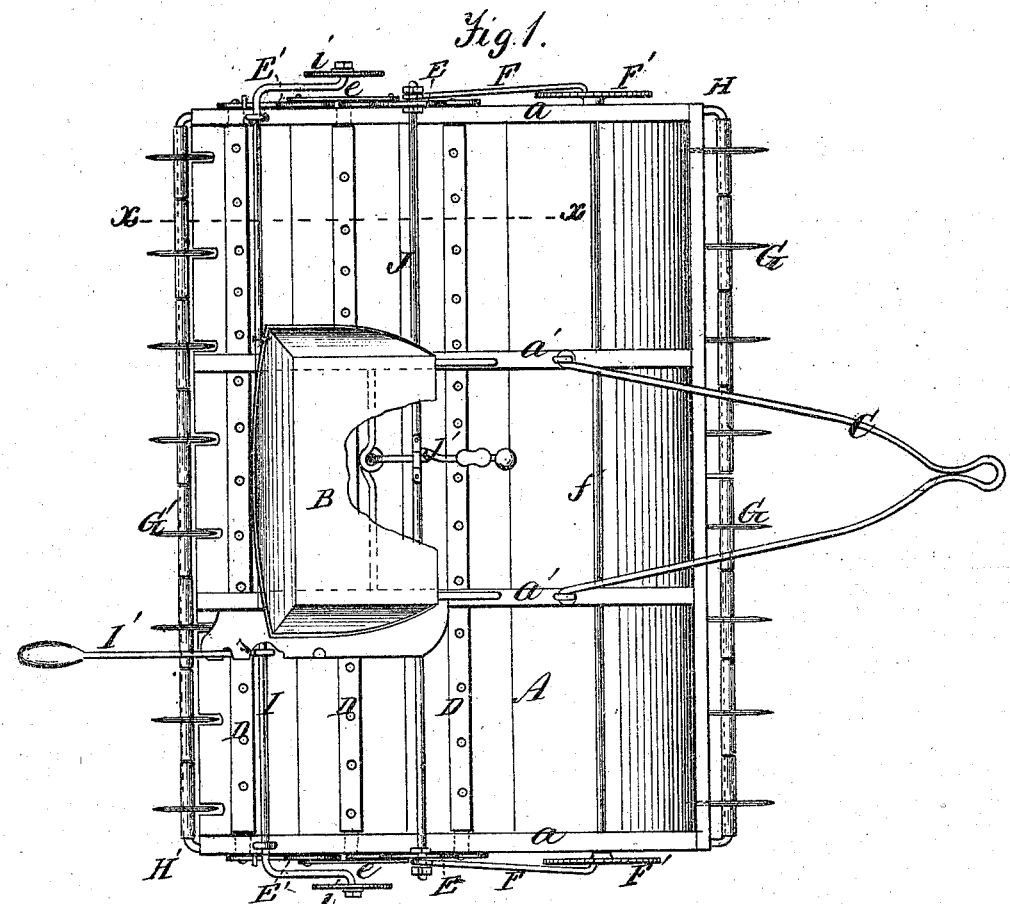
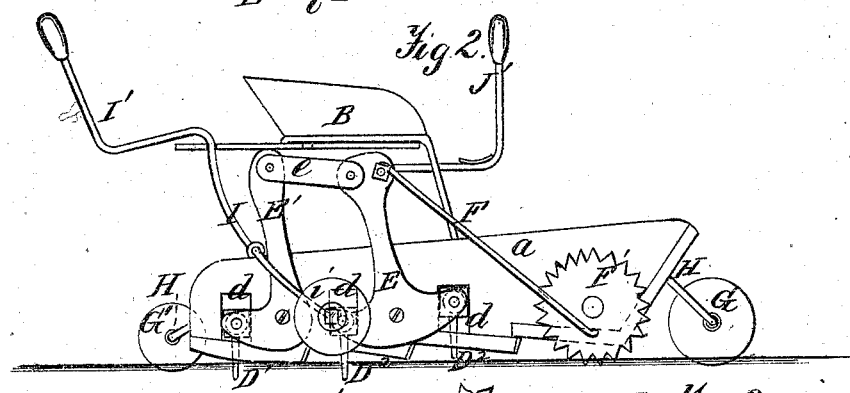
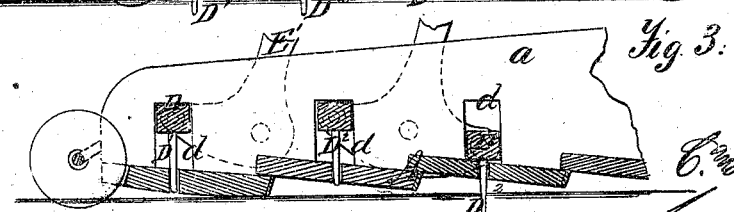

121,021

UNITED STATES PATENT OFFICE.

COLIN THARP AND GEORGE P. THARP, OF BRYAN, OHIO.

IMPROVEMENT IN HARROWS.

Specification forming part of Letters Patent No. 121,021, dated November 14, 1871.

*To all whom it may concern:*

Be it known that we, COLIN THARP and GEORGE P. THARP, of Bryan, in the county of Williams and State of Ohio, have invented certain new and useful Improvements in Harrows; and we do hereby declare the following to be a full, clear, and exact description thereof, reference being had to the accompanying drawing forming a part of this specification, in which—

Figure 1 represents a plan view of our improved harrow. Fig. 2 is a side view of the same, and Fig. 3 a section through the dotted line $x\ x$ of Fig. 1.

Similar letters of reference in the several figures refer to like parts.

This invention has reference to an improved harrow; and it consists of the parts thereof in combination, as hereinafter described and claimed.

To enable others to make and use our invention, we will proceed to describe it.

In the accompanying drawing, A refers to the platform, having the sides or right-angular portions $a\ a$ and partitions $a'\ a'$, to the upper edges of which are fastened metallic bars or rods supporting the driver's seat B. C refers to a metallic loop, to which the whiffletree for attaching the animals to the machine is secured. This loop is loosely attached to the upper edges of the partitions $a'\ a'$. D D D refer to the longitudinal bars, to which the harrow-teeth $D^1\ D^2\ D^2$ are attached, and which move vertically within slots $d\ d\ d$ made in the sides $a\ a$ of the platform. The harrow-teeth $D^1\ D^2\ D^2$ are made to pass through apertures made in the said platform A and enter the ground. E E' refer to rocking bars, the bars E E being pivoted at a point between the ends of its right-angular portions and in such a manner as that the harrow-teeth $D^2\ D^2$, carried by the longitudinal bars attached to the said bars E E, will be alternately thrust into the ground as the said bars are operated, while the bars E' E' are pivoted to the sides $a\ a$ of the platform A (as are also the bars E E,) at the point of union between their horizontal and vertical portions, as plainly shown in Fig. 2, whereby, when the said bars E' E' are operated, the harrow-teeth $D^1$, attached thereto the same as the teeth $D^2\ D^2$ are to the bars E E, will have an up-and-down motion and be thrust into and relieved from contact with the ground simultaneously with the rear series of the teeth $D^2\ D^2$, the front series of the latter at the same time being elevated, as plainly illustrated in Fig. 2, and depressed when the said rear series and the teeth $D^1$ is elevated, as shown in Fig. 3. No two series of the harrow-teeth above alluded to occupy the same relative position, or are in a line with each other, as shown in Fig. 1, giving a top or plan view of the same, the object of which being too obvious for explanation. Each pair of the bars E E' is connected together by means of links or plates $e\ e$, pivoted or attached thereto as to permit of their having a rocking motion imparted to them when the said bars are in like manner affected. A connecting-rod, F, connects each of the front or forward rocking bars E E with a serrated disk, F', which is for the purpose of imparting motion to the rocking bars E E' operating the longitudinal bars D D D carrying the teeth $D^1\ D^2\ D^2$. The serrated or toothed disks F' F' are fastened upon a rod or shaft, $f$, having its bearings within apertures in the sides $a\ a$ of the platform A, and are connected with the connecting-rods F F in such a manner as to act as eccentrics for imparting a vibratory motion to the said rods. G G' refer to two series of cylindrical cutters or knives, through the center of each one of which cutters passes a tube or hollow shaft, fastened permanently thereto and receiving stationary shafts or rods H H', upon which said hollow shafts with the said cutters revolve, the rod or shaft H carrying the series G being fastened to the front end of the platform A, while the shaft H' carrying the series G' is fastened to the rear end of the said platform, as shown in Figs. 1 and 2. These knives or cutters are for the purpose of pulverizing the clods or for cutting them up. A bar, I, extending across the rear part of the machine and loosely attached to the upper edges of the sides $a\ a$ thereof by means of staples, is bent downward and thence outward in such a manner as to form axles for the trucks $i\ i$, which are for the purpose of allowing the platform A to be elevated so as to relieve the harrow-teeth from contact with the ground. Attached to the bar or rod I is a lever or handle, I', which, when thrown back or forth, will elevate or depress the trucks $i\ i$, lowering or elevating the platform A. J refers to a rod or bar extending longitudinally of the platform A and attached to the front rocking bars E E. To this rod is secured a hand-and-foot lever, J', which is for the purpose of operating the harrow-teeth should it be desired to dispense with the operating mechanism F F'.

Having thus described our invention, what we claim, and desire to secure by Letters Patent, is—

1. The teeth $D^1$ $D^2$ $D^2$ attached to bars D D D, in combination with the rocking bars E E', connected together by suitable means and operated by the mechanism F F', as and for the purpose described.

2. The improved harrow herein described and shown, consisting of the platform A $a$ $a$, knives G G', trucks $i$ $i$, and the mechanism E E' F F' for operating the bars D D D, all in combination substantially as shown and described.

In testimony that we claim the foregoing as our invention we hereunto set our hands this 1st day of July, A. D. 1871, in the presence of two subscribing witnesses.

COLIN THARP.
GEORGE P. THARP.

Witnesses:
B. H. FISHER,
PHILETUS SMITH.   (73)